United States Patent

[11] 3,570,799

[72] Inventor  Edwin L. Schwartz
              Los Angeles, Calif.
[21] Appl. No. 864,310
[22] Filed     Oct. 7, 1969
[45] Patented  Mar. 16, 1971
[73] Assignee  Rite Autotronics Corporation
              Los Angeles, Calif.

[54] MOUNT FOR INSTRUMENTS AND THE LIKE
     10 Claims, 5 Drawing Figs.
[52] U.S. Cl. .................................................. 248/291,
                                          240/8.2, 248/479
[51] Int. Cl. .................................................. B60q 1/32
[50] Field of Search .......................................... 16/171,
          172; 240/8.1, 8.2, 8.3; 248/286, 291, 485, 489,
                                    479, 284, 289, 259, 324

[56]              References Cited
              UNITED STATES PATENTS
  632,858   9/1899   Waibel et al. ................. 248/291x
1,321,257  11/1919   Stearns ......................... 248/289x
2,708,224   5/1955   Rittenhouse .................. 248/291x FOREIGN PATENTS
859,534  12/1940  France ......................... 248/291

Primary Examiner—Roy D. Frazier
Assistant Examiner—J. Franklin Foss
Attorney—Robert E. Geauque ABSTRACT: A mount for attaching an instrument or other article to a mounting surface. The mount includes a mounting bracket having a base to be attached to the mounting surface and a pair of parallel sidewalls rising from the base for straddling a coupling tongue on the article to be supported. The sidewalls are formed with outwardly directed flanges along their edges and with slots which open endwise through the sidewall edges and flanges. The article is attached to the mounting bracket by means of a coupling pin which extends through the bracket slots and the article coupling tongue. This coupling pin has enlarged shoulder elements which project laterally beyond the sides of the slots and under the sidewall flanges to effectively captivate the pin against axial and lateral separation from the bracket. The mounting bracket is uniquely shaped to be cast in finished form without the aid of removable cores, thus to minimize production cost.

PATENTED MAR 16 1971
3,570,799
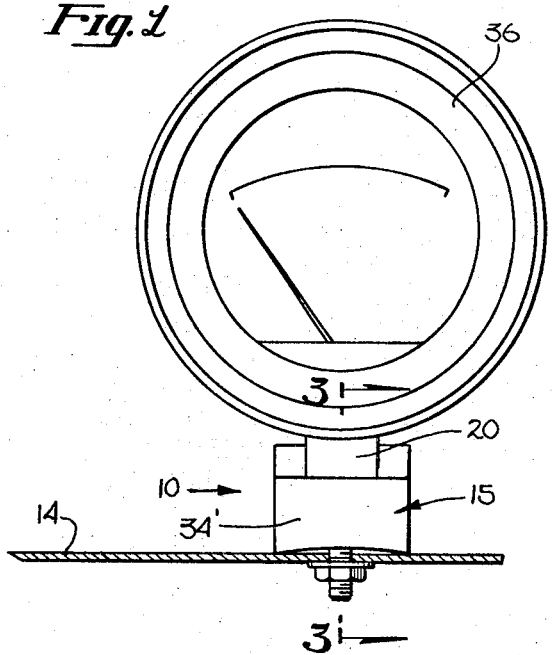
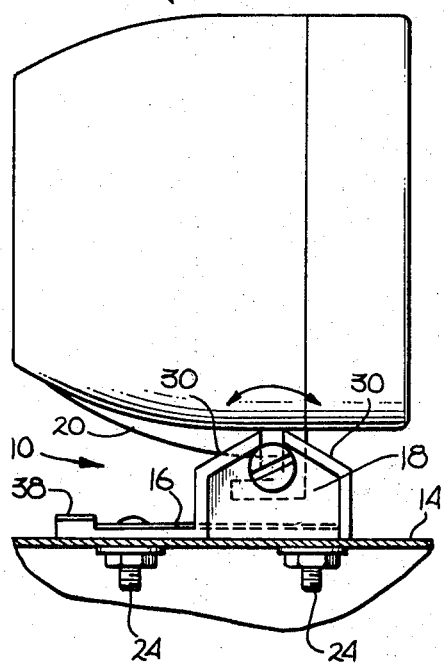
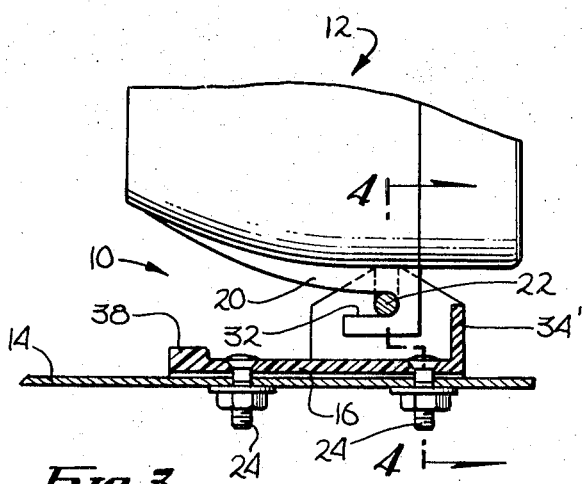
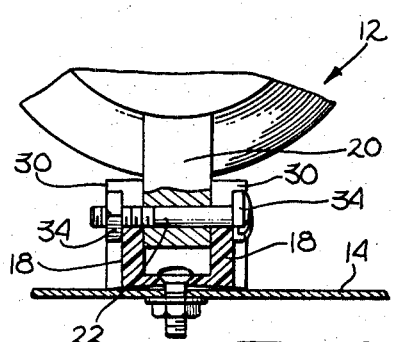
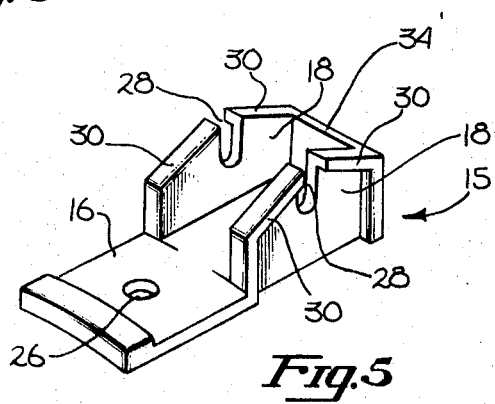
EDWIN L. SCHWARTZ
INVENTOR.
BY R.S. Granque
ATTORNEY

MOUNT FOR INSTRUMENTS AND THE LIKE

BACKGROUND OF THE INVENTION

1. Field of the Invention

This invention relates generally to mounting devices for instruments and other articles and more particularly to a mount for an article having a depending coupling tongue.

2. Prior Art

A conventional mount of the class described includes a mounting bracket with a base to be attached to a mounting surface, and a pair of sidewalls rising from the base to straddle the coupling tongue of the article to be supported. The article is attached to the mounting bracket by means of a coupling bolt which extends through the bracket sidewalls and the article-coupling tongue.

The mounting brackets for mounts of this kind may be fabricated in various ways. The present invention is primarily concerned with such mounting brackets which are produced by a casting or molding process.

The existing cast-mounting brackets are characterized by one disadvantage which this invention overcomes. The disadvantage referred to involves the manner in which the bracket sidewalls are formed with openings to receive the bracket coupling bolt. In some cases, the sidewall openings comprise slots which open through the edges of the bracket sidewalls. The advantage of this bracket configuration resides in the fact that the mounting bracket may be molded or cast in one piece, complete with the sidewall slots, without the aid of removable cores in the mold or die cavity. While this method of fabrication reduces the production cost of the mounting bracket, the resulting bracket configuration is not satisfactory for the reason that it does not positively captivate the coupling bolt. As a consequence, the article being supported is free to separate from the mounting bracket when the coupling bolt is loosened.

This latter problem may be avoided by providing the mounting bracket sidewalls with circular holes to receive the coupling bolt. This bracket configuration obviously captivates the coupling bolt and thereby prevents separation of the bolt from the bracket when the bolt is loosened. The bolt holes may be provided in the bracket sidewalls in either of two ways. Thus, the bolt holes may be cast in the bracket sidewalls. Alternatively, these bolt holes may be drilled after the bracket has been cast. In either case, production costs are substantially increased. The increased production cost involved in casting the holes in the bracket sidewalls results from the necessity of using removable cores in the die or mold cavity to form the holes. The increased production cost involved in drilling the holes results from the additional steps which are then necessary to initially set up the mounting bracket in a drilling machine and to thereafter operate the machine to actually drill the holes.

SUMMARY OF THE INVENTION

The present invention provides an improved mounting bracket configuration for a mount of the class described. The bolt holes in the bracket sidewalls comprise slots which open through the sidewall edges so that the slots may be cast directly in the sidewalls without the aid of removable cores in the die or mold cavity. The production cost of the mounting bracket is thereby substantially reduced. This reduction in production cost is due, in part, to the omission of removable cores from the casting or molding operation and, in part, to the omission of drilling operations following the casting operation. A feature of the invention resides in the fact that the mounting bracket is uniquely shaped to captivate the coupling pin or bolt, thus to prevent inadvertent separation of the pin, and hence the article being supported, from the mounting bracket.

To these ends, the sidewalls of the present mounting bracket are formed with outwardly directed flanges along their edges through which the sidewall slots open. The coupling pin has enlarged shoulder elements at its ends which project laterally beyond the sides of the slots and under the sidewall flanges in such a way that the pin is captivated by the bracket against both axial and lateral separation from the bracket. Thus, the invention provides a mounting bracket configuration which possesses the advantages of both a captive coupling pin and low production cost resulting from the omission of removable cores from the bracket-casting operation.

In use, the mounting bracket is fixed to a mounting surface, and the coupling tongue of the instrument or other article to be supported is inserted between the bracket sidewalls. The coupling pin or bolt is then inserted through the sidewall slots and the coupling tongue to secure the article to the bracket. The particular mount illustrated herein is designed to permit pivotal adjustment of the supported article relative to the mounting bracket when the coupling pin or bolt is loosened. The captive coupling pin feature of the invention is advantageous in this case for the reason that it prevents inadvertent separation of the supported article from the mounting bracket during such pivotal adjustment.

BRIEF DESCRIPTION OF THE DRAWINGS

FIG. 1 is a front elevation of an instrument mount according to the invention;

FIG. 2 is a side elevation of the instrument mount;

FIG. 3 is a section taken on line 3–3 in FIG. 1;

FIG. 4 is a section taken on line 4–4 in FIG. 3; and

FIG. 5 is an enlarged perspective view of the novel mounting bracket of the instrument mount.

DESCRIPTION OF THE PREFERRED EMBODIMENT

Turning now to these drawings, there is illustrated an instrument mount 10 according to the invention supporting an instrument 12 on a mounting surface 14. The instrument mount 10 includes a mounting bracket 15 having a generally planar mounting base 16 and a pair of spaced parallel sidewalls 18 rising from the base along opposite edges thereof. The outer surfaces of these sidewalls are flush with the base edges. Depending from the underside of the instrument case is a coupling tongue 20 which fits slidably between the bracket sidewalls 18. A coupling pin 22, which in this instance is a bolt, extends through the sidewalls and the coupling tongue to secure the instrument 12 to the mounting bracket 15. The bracket, in turn, is secured to the mounting surface 14 by screws 24. In the particular mounting bracket shown, the mounting base 16 is arcuate in cross section and arches upwardly to permit attachment of the bracket to either a flat mounting surface, as shown, or to a convex mounting surface.

As noted earlier, the primary feature of the invention resides in the unique configuration of the mounting bracket 15. This configuration is such that the bracket may be cast or molded in a finished form which includes both the mounting base openings 26 for the mounting screws 24 and the sidewall openings 28 for the coupling pin 22, and without the aid of removable cores in the die or mold cavity. This feature, then, reduces the production cost of the mounting bracket due, in part, to the elimination of removable cores from the casting operation and, in part, to the elimination of a drilling operation following the casting operation.

According to another feature of the invention, the mounting bracket 15 and the coupling pin 22 are designed to cooperate with one another in such a way that the coupling pin is captivated by the bracket. This feature prevents both axial and lateral separation of the coupling pin from the mounting bracket, even when the pin is loosened to permit adjustment of the instrument 12 relative to the bracket. The instrument coupling tongue 20, in turn, is captivated by the coupling pin 22. Accordingly, inadvertent separation of the instrument 12 from the mounting bracket 15 is prevented.

To these ends, the mounting bracket sidewalls 18 are formed with outwardly directed flanges 30 along their upper edges. The sidewall coupling pin openings 28 comprise vertical slots, normal to the bracket mounting base 16, which open upwardly to the upper sidewall edges and flanges. In the particular embodiment illustrated, the sidewall flanges 30 have vertical portions which extend downwardly along the end edges of the sidewalls to the mounting base 16. The sidewalls are devoid of any flanges along their lower edges. The mounting base screw openings 26 are countersunk holes in the base.

The coupling pin 22 extends through the bracket sidewall slots 28 and through an opening 32 in the instrument coupling tongue 20. On the ends of the pin are enlarged shoulder elements 34 which project laterally beyond the edges of the slot and under the sidewall flanges 30. The coupling pin 22 is thus captivated by the mounting bracket 15 against both axial and upward lateral separation from the bracket. The particular coupling pin shown is a bolt. One shoulder element 34 is formed by the bolt head. The other shoulder element is furnished by a nut threaded on the bolt shank. The opening 32 in the instrument coupling tongue 20 is a slot which opens through an edge of the tongue.

Rising from one end of the bracket mounting base 16 is an end wall 34'. This end wall extends between and is integrally joined to the adjacent end edges of the bracket sidewalls 18. The instrument 12 is installed on the mounting bracket 15 in such a way that the slot 32 in its coupling tongue 20 opens away from the end wall 34'. The spacing between this end wall and the coupling bolt 22 is such that the coupling tongue is captivated between the end wall and the bolt. Thus, the coupling bolt is captivated by the mounting bracket, and the instrument, in turn, is captivated by the coupling bolt. Inadvertent separation of the instrument from the mounting bracket is thereby prevented, even though the coupling bolt accidentally works loose or is deliberately loosened to adjust the instrument relative to the bracket. In this latter regard, it is significant to note that the upper edges and flanges 30 of the bracket sidewalls 18 slope downwardly toward the mounting base 16 in the direction of the outer ends of the flanges to accommodate pivotal adjustment of the instrument 12 about the coupling bolt. The bolt may be tightened after adjustment to secure the instrument in adjusted position. The flange adjacent the nut engages the flat sides of the nut to keep it from turning when the bolt is rotated.

The particular instrument 12 shown has a front face 36 adjacent the mounting bracket end wall 34'. This end wall, therefore, constitutes a front end wall of the mounting bracket 15. The rear end of the bracket-mounting base 16 extends rearwardly of the bracket sidewalls 18 and is formed with a raised pad 38 to seat the rear tapered end of the instrument case 20 when the instrument is rotated rearwardly.

It is evident from the foregoing description and from the drawings that the mounting bracket 15 is uniquely shaped to be molded or cast to a finished form, including its mounting base screw openings 26 and its sidewall slots 28, without the aid of removable cores to form either the openings or the slots. In other words, these openings and slots, as well as the other portions of the bracket, may be formed by suitable shaping of the cavity. This molding or casting of the openings and slots, of course, eliminates the need for subsequently drilling and machining the same after casting of the bracket. The production cost of the bracket is thereby substantially reduced.

I claim:

1. A mount for an article, such as an instrument, having a depending coupling tongue, comprising:
    a mounting bracket including a mounting base and a pair of spaced generally parallel sidewalls integrally joined to and rising from said base along two opposite edges of the base for straddling said coupling tongue;
    said sidewalls having outer surfaces flush with said base edges, respectively, outwardly directed flanges along the edges of said sidewalls, and slots opening endwise through said sidewall edges and flanges; and
    said slots being adapted to receive a coupling pin with enlarged shoulder elements at its ends in a manner such that said shoulder elements project laterally beyond the edges of said slots and under said sidewall flanges to positively captivate said pin against both axial and lateral separation from said bracket.

2. A mount according to claim 1 wherein:
    said sidewall edges are upper edges of said sidewalls, said slots are vertical slots normal to said base which open upwardly through said upper edges and flanges, said bracket sidewalls have end edges extending between said base and said upper sidewall edges, and said flanges extend along said upper wall edges from said slots to said end edges and then downwardly along said end edges to said base to reinforce said sidewalls; and
    said sidewalls are devoid of flanges along their lower edges.

3. A mount according to claim 2 wherein:
    said mounting bracket base has an end edge extending between corresponding end edges of said bracket sidewalls; and
    said mounting bracket includes an end wall rising from and integrally joined to said mounting base along said base end edge and extending between and integrally joined to corresponding end edges of said sidewalls.

4. A mount for an article, such as an instrument, having a depending coupling tongue, comprising:
    a mounting bracket including a mounting base and a pair of spaced generally parallel sidewalls integrally joined to and rising from said base along two opposite side edges of the base for straddling said coupling tongue;
    said sidewalls having outer surfaces flush with said base edges, respectively, outwardly directed flanges along the edges of said sidewalls, and slots opening endwise through said sidewall edges and flanges; and
    a coupling pin positioned in said sidewall slots and having enlarged shoulder elements at its ends projecting laterally beyond the edges of said slots and under said sidewall flanges, whereby said coupling pin is captivated by said mounting bracket against both axial and lateral separation from said bracket.

5. A mount according to claim 4 wherein:
    said coupling pin is a bolt having a head forming one of said shoulder elements and a nut threaded on the bolt forming the other shoulder element; and
    the sidewall flange adjacent said coupling bolt nut engaging said nut to restrain the same against rotation when said bolt is rotated.

6. A mount according to claim 1 wherein said sidewall flanges slope downwardly toward said mounting base in directions away from said slots and toward the end edges of said bracket sidewalls.

7. A mount for an article, such as an instrument, having a depending coupling tongue comprising:
    a mounting bracket including a mounting base and a pair of spaced generally parallel sidewalls integrally joined to and rising from said base along two opposite side edges of the base;
    said sidewalls having outer surfaces flush with said base edges, respectively, outwardly directed flanges along the upper edges of said sidewalls, and vertical slots generally normal to said base and opening upwardly through said sidewall edges and flanges;
    said article-coupling tongue fitting slidably between said bracket sidewalls; and
    a coupling pin extending through said bracket sidewall slots and said coupling tongue and having laterally enlarged shoulder elements at its ends which project laterally beyond the edges of said slots and under said sidewall flanges, whereby said coupling pin is captivated by said mounting bracket against both axial and upward lateral separation from said bracket and said article is positively attached to said mounting bracket.

8. A mount according to claim 7 wherein said coupling pin comprises a bolt having a head which forms one of said shoulder elements and mounting a nut which forms the other shoulder element.

9. A mount according to claim 7 wherein said sidewall flanges slope downwardly in directions away from said slots toward the end edges of said bracket sidewalls to permit pivotal adjustment of said article about said coupling pin.

10. A mount according to claim 7 wherein:
  said mounting bracket includes an end wall integrally joined to and rising from one end of said mounting base and extending between and integrally joined to corresponding end edges of said bracket sidewalls;
  said coupling tongue has a slot opening away from said end wall and receiving said coupling pin; and
  the spacing between said end wall and coupling pin is such that said coupling tongue is captivated between said end wall and coupling pin.